(12) United States Patent
Carter, III et al.

(10) Patent No.: US 7,584,155 B1
(45) Date of Patent: Sep. 1, 2009

(54) METHOD AND APPARATUS FOR EFFICIENT DELTA PRICING

(75) Inventors: Thomas J. Carter, III, Austin, TX (US);
Meetesh M. Karia, Austin, TX (US);
August R. Buerkle, Austin, TX (US);
Boris Motik, Karlsruhe (DE);
Ramanathan Ramadass, Dublin, CA (US); Reuben Swartz, Austin, TX (US)

(73) Assignee: Trilogy Development Group, Inc., Austin, TX (US)

(*) Notice: Subject to any disclaimer, the term of this patent is extended or adjusted under 35 U.S.C. 154(b) by 772 days.

(21) Appl. No.: 10/061,896

(22) Filed: Feb. 1, 2002

(51) Int. Cl.
*G06Q 99/00* (2006.01)
(52) U.S. Cl. ............... 705/400; 705/1; 705/10; 705/26; 705/27; 703/1; 707/2
(58) Field of Classification Search ............ 705/1, 705/400, 10, 26; 703/1; 707/2
See application file for complete search history.

(56) References Cited

U.S. PATENT DOCUMENTS

| | | | | |
|---|---|---|---|---|
| 5,708,798 A * | 1/1998 | Lynch et al. | ............... | 703/1 |
| 6,052,669 A * | 4/2000 | Smith et al. | ............... | 705/26 |
| 6,167,383 A * | 12/2000 | Henson | ............... | 705/26 |
| 6,453,255 B1 * | 9/2002 | Smorodinsky et al. | ........ | 702/81 |
| 6,675,294 B1 * | 1/2004 | Gupta et al. | ............... | 713/1 |
| 6,898,580 B1 * | 5/2005 | Curran et al. | ............ | 705/400 |
| 7,035,815 B1 * | 4/2006 | Henson | ............... | 705/26 |
| 7,035,816 B2 * | 4/2006 | Jankelewitz | ............... | 705/26 |
| 7,130,821 B1 * | 10/2006 | Connors et al. | ........... | 705/27 |
| 7,188,075 B1 * | 3/2007 | Smirnov | ............... | 705/10 |
| 7,353,192 B1 * | 4/2008 | Ellis et al. | ............... | 705/27 |
| 7,369,970 B2 * | 5/2008 | Shimizu et al. | ........... | 703/1 |
| 2001/0034726 A1 * | 10/2001 | McMahon et al. | ....... | 705/400 |
| 2003/0088431 A1 * | 5/2003 | Hara et al. | ............... | 705/1 |
| 2005/0102199 A1 * | 5/2005 | Lee | ............... | 705/27 |

FOREIGN PATENT DOCUMENTS

WO WO0175729 A2 * 10/2001

OTHER PUBLICATIONS

Dewan et al., "Adoption of Internet-Based Product Customization and Pricing Strategies", Fall 2000, vol. 17, No. 2, pp. 9-28, (21 pgs.).*
"Trilogy Takes Suites Route", May 13, 1996, Information Week, n 579, p. 95 (2pgs).*

* cited by examiner

*Primary Examiner*—John W Hayes
*Assistant Examiner*—Freda A. Nelson
(74) *Attorney, Agent, or Firm*—Hamilton & Terrile, LLP; Kent B. Chambers

(57) ABSTRACT

A method includes generating a delta price and generating a final price using the delta price. A process and system provide an ability to determine a product's final price with a selected set of features in which multiple configurations are to be generated. The ability to determine such final prices can be based on the ability to determine the change in price between one configuration of a product and that of another product configuration (e.g. the product configured with the desired feature(s)). A customer is able to select one or more features, and so view the effect on the product's final price, as well as compare the prices (and incremental price differences) between various configurations of a given product. This increases the likelihood of the purchase being made, because it provides the potential purchaser with the final price earlier in the sales cycle.

34 Claims, 11 Drawing Sheets

Bit Vector
550

METHOD AND APPARATUS FOR EFFICIENT DELTA PRICING

BACKGROUND OF THE INVENTION

1. Field of the Invention

The present invention relates to transacting commerce over a network and, more particularly, to a method and apparatus for processing information related to such commercial transactions.

2. Description of the Related Art

Historically, information regarding commercially available products has been disseminated using various types of well-known media, including print, radio, television, and the like. With the advent of the Internet, a wide array of product information has become even more accessible to the average person. Entities providing such product information have been assisted in their endeavor by networking and client/server technology that has become available in approximately the last ten to fifteen years. Such technology typically allows a number of users employing client terminals to communicate with a remote server computer in order to transfer information therebetween. This information may include text, data in any one of a number of formats, graphical information, streaming audio and video, and other such information. To facilitate such transfers, client terminals can employ a "web" browser that provides access to a server via a graphical user interface (GUI). The server responds to requests from the client by providing information in the form of a "web page." One popular collection of servers uses Hypertext Transfer Protocol (HTTP) to provide information. This network of servers and web pages is commonly known as the "World Wide Web" (WWW). A collection of related web pages is often referred to as a "website" or more simply a "site." Information in the WWW is typically presented as web pages which contain text along with standardized formatting and control symbols such as those present in mark-up languages such as Hypertext Mark-up Language (HTML). HTML provides basic hypertext document formatting and allows a server to specify "links" to other servers and files. Use of an HTML-compliant browser involves specification of a link via a Uniform Resource Locator (URL). Upon such specification, the user's client terminal makes a TCP/IP request to the server identified in the link and receives an HTML file that is interpreted by the browser so that an electronic HTML document made up of one or more web pages may be displayed on the client's terminal.

Unfortunately, however, the use of the functionality provided by technologies that allow the selection and purchase of products (e.g., e-commerce websites) is less than ideal. Client-side performance is a significant factor in such a network environment, especially in an e-commerce context, and factors that degrade website performance likewise degrade the purchasing experience. Fundamentally, a website that is slow (and therefore aggravating to use) can result in lost sales. Thus, factors that degrade client-side performance should be avoided if the user's buying experience is to be a pleasant one. An example of such a factor is the time involved in accessing a product information database, especially where the database access is performed over a network of some sort (e.g., a storage area network (SAN)). Such effects can depend on several factors, with certain of these factors being quite intuitive in nature.

In the case where a customer desires pricing information for various configurations of a selected product, pricing of a base configuration of a product or a product with a pre-set, "standard" feature set is relatively straightforward. However, as the customer adds features to and removes features from the selected product, the product's final price may change according to not only the features added or removed, but also according to any package pricing, discounts, variations in taxes and/or shipping charges, and other such adjustments. Moreover, the selection of one feature may change the price of another selected feature, require other upgrades, obviate the need for certain features, and/or may change the classification of the current package altogether. There may also be differences in pricing for a given feature based on the customer (e.g., the customer's status, location, contractual agreement or the like), product-specific discounting schemes, and other such criteria. Further, other factors such as shipping may change relative to the configuration, number of items, and so on.

For example, in an e-commerce scenario, if the price of a single product configuration is desired, various factors (e.g., user identity, geographical location, promotions, volume and the like) can be taken into account when pricing the product (or service) for purchase (e.g., via an e-commerce website). This pricing request results in a database access that gathers the requisite pricing information. An example of such a pricing system (or pricing engine) is described in U.S. Pat. No. 5,878,400, issued Mar. 2, 1999, by Carter and entitled "Method and Apparatus for Pricing Products in Multi-Level Product and Organizational Groups." Thus, pricing on a component-by-component level is generally available.

In the situation where a product is available in a number of configurations (each of which represent a given set of features), however, each product configuration will typically include different combinations of the available features. Each such configuration needs to be priced accordingly. This requires multiple accesses, typically over a network, to retrieve the necessary data and generate the desired pricing information. The problem is compounded when the pricing information for a given feature (or other cost) depends upon the features selected in a given configuration. In an e-commerce system such as that described previously, this is especially problematic if the user desires to compare pricing between a number of configurations simultaneously. This is because the user is forced to wait for all the database accesses to complete before a complete comparison can be made. Thus, delays are particularly evident in the situation where a user desires pricing information for a number of product configurations simultaneously.

For example, as noted, a prospective purchaser may desire to configure and price an automobile. The prospective purchaser does not want to wait until they have specified all the possible options in order to view a price. In fact, the prospective purchaser may desire to view both a running total price, as well as the incremental price of each item that the prospective purchaser is currently considering. For example, the prospective purchaser may have already configured a base vehicle, but is provided the option of selecting a "CD Player" or a "High-End Stereo System." The decision on which to purchase is typically based on, among other criteria, on the change in price caused by each option. One option is to display the $500 price of the CD Player and the $750 price of the High-End System. However, the currently configured base vehicle already has the standard stereo (costing $200). The manufacturer would prefer that the prospective purchaser realize that the CD Player only costs $300 additionally and the High-End System only costs $550 additionally. This is effectively an upsell opportunity.

Similar to seeing the choice for radio options, a potential purchaser might also see the option of purchasing leather seats. Though the leather seats only cost $1500, the leather seats are simply not offered on the base vehicle and are instead offered only on the Luxury model. The Luxury package costs $2000, bringing the cost of the current configuration to $3500. To make the example more complete, consider that the currently priced base vehicle costs $19,000, but a purchaser receives a $1000 rebate check if the vehicle costs $20,000 or more. Even though the Luxury package and leather seats add $3500 to the current price, in fact a $1,000 rebate is given (resulting in a net difference of only $2500).

In light of the variations presented in the foregoing example, and the myriad other possible variations and combinations thereof, incremental differences in price (i.e., the difference between the price of the currently configured vehicle and another configuration) need to be calculated, and the price of the vehicle configured with the various options presented. The example demonstrates that this requires some configuration integration (i.e., to know the base radio needs to be removed, or the Luxury package needs to be added). A configuration with the leather seats, combined with the rebate, illustrates that the old product price cannot simply be manipulated by adding/subtracting the prices of the individual options. To get the true price, the pricing engine must calculate the product's total price with each desired set of options. As will be apparent to one of skill in the art, when such operations must be performed for every option presented to a prospective purchaser, tens or even hundreds of such operations must be performed every time the information is redisplayed, which should occur every time the potential purchaser adds or removes an option from the given configuration.

One method of addressing this need is to call a pricing engine (through the pricing service or using the methods directly), and so create a collection of items and price all the items together in the context of a quote. To perform pricing operations using such an approach, a separate quote with all of the base items must be individually created, with the quote including the options being added to the base configuration (e.g., a new radio, or leather seats and the luxury package together) and excluding the options to be removed (e.g., the stock radio). Each quote is priced separately with no benefit from having already retrieved the appropriate adjustments from the database or the previously-calculated base price. This creates a multitude of database accesses, with the attendant problems discussed earlier.

Another alternative is to simply price all possible (or allowable) combinations of features, and then save the pricing and feature information thus generated in a database accessible by the web server presenting the information to the customer. While conceptually simple, this solution suffers from several infirmities. Such a database would be quite large by a relative measure, increasing retrieval time, as well as the cost of maintaining such information. Also, the database would need to be accessed each time a new quote was required, entailing the aforementioned increase in retrieval time for each such quote. Each access, in turn, would necessitate the regeneration of the web page to display the results of each such access, further delaying the display of pricing information. Also, because of the large number of potential configurations, generation of this pricing data is often impractical.

Thus, the list price of a given feature may not reflect the price to actually be paid by the customer for a variety of reasons, and so determination of a product's final price can be a complex, and time-consuming, exercise. By contrast, when investigating the costs associated with various combinations of features, and when employing web-based technology in general, providing the desired pricing information quickly and accurately improves a customer's buying experience, as well as increasing the likelihood that the customer will actually make a purchase. Moreover, the earlier in the navigation of the e-commerce website this information can be provided to the prospective purchaser, the more likely the prospective purchaser is to complete the purchase.

Furthermore, prospective purchasers are also more likely to make a purchase in the scenario where the prospective purchaser sees a given combination of features (products, services or the like) as costing only an incremental amount over a "base" (or given) configuration. By making the increment the focus of the prospective purchaser's attention, emphasis on the total outlay is minimized in the user's mind. This can encompass any costs associated with a given purchase.

SUMMARY OF THE INVENTION

The inventors have thus effected the ability to generate delta pricing information, and so price features (products, services or the like) incrementally in an e-commerce environment. Moreover, described herein is a software architecture capable of generating such delta pricing information in a fast, efficient manner, to provide the purchaser with an enjoyable buying experience. Sales by the seller of such products, services or the like are increased thereby, as well as by shifting the prospective purchaser's focus to any additional incremental cost (or lack thereof, and, optionally, by comparison to the feature's actual cost).

In one embodiment of the present invention, a method of generating a price is disclosed. The method includes generating a delta price and generating a final price using the delta price.

In another embodiment of the present invention, a software architecture is disclosed. The software architecture includes a quote processor configured to process a super-quote. The super-quote is configured to cause a number of database accesses.

In yet another embodiment of the present invention, a method of retrieving information is disclosed. The method includes performing a plurality of queries on a database, receiving a number of data at a pricing engine in response to the queries, and providing at least one of the data without accessing said database.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items, unless otherwise indicated.

DETAILED DESCRIPTION OF THE INVENTION

Figure 1A:
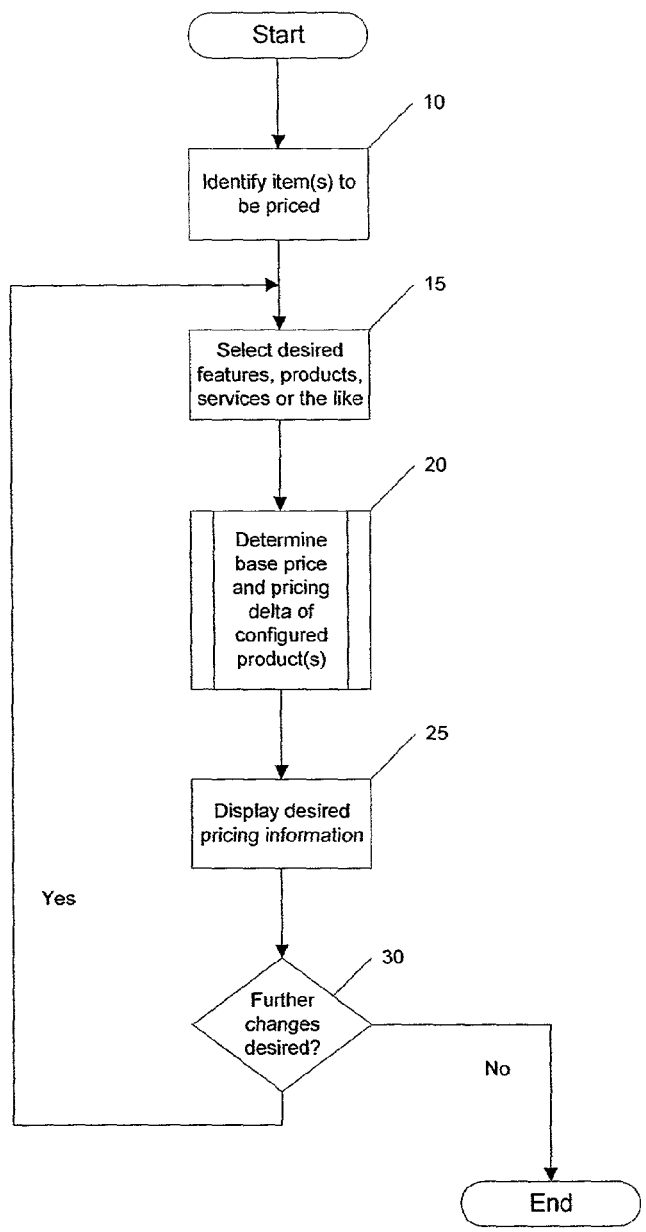
FIG. 1A is a flow diagram illustrating an example of operations performed in providing delta pricing information.

The following is intended to provide a detailed description of one or more example embodiments of the invention and should not be taken to be limiting of the invention itself. Rather, any number of variations may fall within the scope of the invention which is defined in the claims following the description.

Introduction

The present invention provides a process and a supporting software architecture that provide the ability to quickly and efficiently determine a product's final price with a selected set of features, particularly in a situation in which changes in configuration (e.g., made by a potential purchaser) are to be immediately reflected in the product's final price, in which multiple such configurations are to be generated (e.g., and presented to a prospective buyer, typically simultaneously), and the like. The ability to determine such final prices can be based on the ability to determine the change in price between one configuration of a product (e.g., the price of the product's base configuration) and that of another product configuration (e.g., the product configured with the desired feature(s)). The term "final price," as used herein, refers to the ultimate price to be paid by the consumer, whether that be in the form of a static value for only that product without consideration of any other product or criteria, or the incremental (delta) price of that product when selected in addition to any number of other products or criteria.

A customer can access this functionality using, for example, a network (e.g., the Internet) using a WWW interface (e.g., a web browser). Using a website employing such a software architecture (also referred to herein as a website architecture), a customer is able to select one or more features, and so view the effect on the product's final price, as well as compare the prices (and incremental price differences) between various configurations of a given product. This increases the likelihood of the purchase being made, because it provides the potential purchaser with the final price earlier in the sales cycle.

The selected features determine, at least in part, the final price of the product with the given product configuration. Additionally, such product configurations can be predefined (e.g., a stored product configuration, a product configuration generated based on general criteria provided by the customer, or other such sources). Once the desired features are selected, the selected product configuration and final price can be displayed for the given configuration. Moreover, the configuration's final price can include peripheral costs and effects thereon by the selected features of the given configuration. The foregoing functionalities can be provided, for example, by software referred to herein as a quote processor, which enables the efficient pricing of a product based on the product's features.

A pricing methodology according to the present invention addresses the shortcomings of various possible alternatives through the use of a super-quote (a quote containing sufficient information to permit the generation of a number of quotes) and persistence of the data thus retrieved. For example, in the case where multiple quotes must be generated to address various configurations of a product desired by a customer, a number of products must be priced (e.g., displaying an entire catalog page for a customer or other such multiple pricing situation), a software architecture according to the present invention combines those multiple quotes into a super-quote. The use of a super-quote allows the necessary information to be retrieved from a pricing database using fewer accesses than would be required using separate accesses for each quote (typically, a single access). This reduces the number of times a database containing the desired information must be accessed. As a result, the time spent accessing the database is reduced. This is of importance because accessing the database can be a relatively slow operation, especially in configurations where the database is accessed over a communications link such as a network. In fact, the results generated by the query for the super-quote can be stored in memory (referred to herein as memory pricing), which speeds the pricing operations considerably in comparison to the time required to access the database (typically stored on some sort of fixed media). Moreover, because the data retrieved in response to a request for a super-quote persists in memory, that data remains available for subsequent queries, thus further eliminating the need to access the database. These increases in speed provide the potential purchaser with a more pleasant purchasing experience, increasing the likelihood of the purchase actually being made.

In effect, a software architecture supporting delta pricing such as that described herein breaks the pricing operation into two parts: a query operation and an operation which calculates the price of the desired configuration. The query operation, as a result of using a super-quote, is typically a single event, with the attendant benefits discussed herein. Because the information thus retrieved is persisted, the latter is simplified, as the data needed for the calculations is readily available.

Delta Pricing

As has been noted, the earlier in the purchasing experience a potential purchaser can be shown a final price, the more likely the potential purchaser is to actually purchase the product(s) (or services or the like) being considered. The final price will reflect the features (or combination of products/services, or similar effects) selected by the potential purchaser. The final price can also be made to reflect other parameters, such as special pricing based on any one of a number of parameters (e.g., the purchaser's identity, geographic location and the like), peripheral costs (e.g., taxes, shipping charges, handling charges and the like), time of the purchase (e.g., time-based discounts, on-/off-season rates, and the like), and other such parameters. It should be noted that delta pricing techniques need not comprehend all inputs to a final price. For example, while the selected features of a product may be employed in arriving at a final price for the given product configuration, peripheral costs may be excluded from such calculations. Alternatively, not all the features selected by a potential purchaser need be included in such calculations. It will be apparent to one of skill in the art that delta pricing techniques can be applied to any appropriate subset of price inputs can be considered when arriving at a final price for a product.

FIG. 1A is a flow diagram illustrating an example of the operation of a user interface that provides functionality according to embodiments of the present invention. First, the potential purchaser identifies the item(s) that the potential purchaser desires to purchase (step 10). This item (or items) can be a product, a service or some other item available for purchase (or, in fact, for lease or by some other commercial arrangement). Next, the potential purchaser selects the features they desire (step 15). It should be noted that this action can also be directed to (or additionally include) the selection of other products, services or the like. Any such actions can be made to alter the final price of the selected features, products, services or the like, including effects on peripheral costs. A determination is then made as to the pricing of the desired product/service configuration, product/service combination or the like (step 20). As noted previously, a product's final price can be altered based on any number of effects. Once determined, final pricing information is then displayed (step 25). This can be, for example, the display of pricing information on a WWW page generated by an e-commerce website. Next, the user is given the option of altering their selections (step 30), which if taken allows the user to change the product's/service's configuration, the products/services selected and to make other changes, as appropriate to the situation. It will be noted that this process can easily be modified to address the situation in which the potential purchaser desires to enter a number of configurations at one time, in order to have a number of configurations (and their corresponding final prices) generated and displayed for comparison therebetween.

Figure 1B:
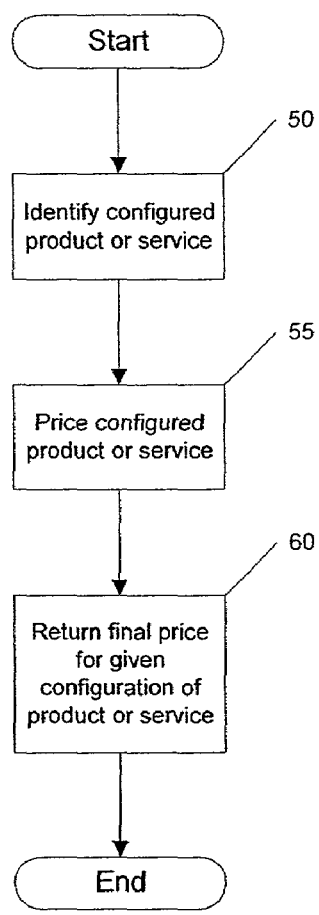
FIG. 1B is a flow diagram illustrating the determination of pricing for a given configuration.

FIG. 1B is a flow diagram illustrating an example of the operations performed in pricing one or more configurations of a product, service or the like when employing a user interface that provides functionality according to embodiments of the present invention. First, the item to be priced (e.g., the product configuration (feature set)) is determined from information provided by the potential purchaser (step 50). This can include, for example, generating a list of possible features, and then determining which of those features are desired. Given this information, a determination is made as to the final price of the item (e.g., the configured product) (step 55). Once this determination is made, the final price (e.g., for the given configuration of the product) is returned (step 60).

The need for delta pricing, and certain of its advantages, can best be understood in the context of an example, similar to that previously discussed. In the context of a vehicle offered for sale, it will be noted that, for example, vehicle manufacturers may not sell a car without an audio system of some sort. To upgrade from a standard AM radio (costing $200, as a "base" configuration) to an FM radio (costing $600), the user will typically not be charged the full price of the FM radio, but instead will incur the incremental cost of that feature. In fact, the purchaser need never be concerned with the fact that the absolute price of the FM radio is $600, because the FM radio will always have been swapped for another option (e.g., the AM radio). This is true of any situation in which a product feature is mandatory, and one alternative is swapped for another. Thus, where the category of product is mandatory, the purchaser is simply trying to decide which product feature is the desired one. The problem changes from a question of "what is the price of the product" to "what is the difference in price, because one of the alternatives will have to be purchased." This is a complex pricing situation in which a base product provides some minimum price, and alternatives are swapped for one another, altering the price as such changes are made.

This kind of general situation, and the problem addressed by embodiments of the present invention, demonstrates that there is substantial market value in being able to provide the incremental price at a number of points in the purchasing process, as well as being able to provide such information even before the potential purchaser has committed to their current selection (e.g., selected feature set), which provides the marketing advantages discussed herein. If the potential purchaser must go through and indicate they desire "A" and "B" to learn the price of that combination, and then indicate that they desire "A" and "C" to learn the price of that combination, the process becomes tedious and repetitive. Determining the price differential then requires the user to perform calculations, further complicating the process and making a sale less likely.

In another example, using a "shopping cart" paradigm, the potential purchaser might have a shopping cart that contains a number of products (typically displayed as a list of selected products). Typically, the list of products will be just that—for example, a list of the products "A", "B", and "C", with some stated price (e.g., "A" is $1, "B" is $2, and "C" is $3). Now if there is another product (or feature), "F", that is available, "F" might be available for only $0.20 more, rather than the full $1 usually charged for "F" alone. Knowing that "F" will be placed in the shopping cart along with "A" implies that the delta in price between "F", and "F" with "A", is only $0.20 (rather than $1). The net effect is that for only $0.20 more, the potential purchaser can add "A" to their purchase. Alternatively, if other products (or features) are to be added to the shopping cart (e.g., "F", "G", and "H"), there may be a substantial reduction in price of the "A"/"B"/"C" combination (e.g., because "G" includes "C", and so "C" is basically free at that point). It is these incremental changes in price that need to be captured and presented to the potential purchaser to motivate the potential purchaser to make the more extensive purchase, by presenting the product(s) as a whole (as opposed to a collection of items), from a pricing perspective.

With regard to the automobile example, the potential purchaser is presented with the price of the base model (e.g., $20,000). The potential purchaser desires the FM radio. The price of the automobile is not now $20,600, but is instead $20,400. Thus, the sales entity is able to tout that for only $400 more, the potential purchaser can purchase the automobile with an FM radio. Moreover, a comparison to the full price of the FM radio can be made, and characterized as selling a $600 FM radio for $400.

Moreover, delta pricing can be performed such that peripheral costs are included in the final price. As noted, peripheral costs include shipping, handling, taxes, and the like. For example, in the purchase of a toy using an e-commerce website, the shipping for a product might be a certain amount. The shipping for a second toy might be the same or only slightly more. This is attractive from a marketing perspective because, in such a scenario, the potential purchaser perceives they will be receiving extra value without extra cost. In the preceding example, the potential purchaser is presented with the impression that they are receiving free shipping, as long as the final price presented reflects this.

Delta pricing can be used as a powerful marketing tool because delta pricing allows the purchaser to easily learn the incremental difference in price cause by adding (or removing) a given selection, when compared to a base price. This is particularly important in an industry where a base configuration is mandatory. Such a marketing approach (and so, functionality) is particularly attractive, for example, in the example given with regard to the purchase of an automobile which includes a radio as a mandatory feature. The use of delta pricing then becomes a powerful marketing tool because the delta in prices is typically going to be less than the absolute price of the given feature. There is typically no case where the potential purchaser will have to pay the full absolute value of a given feature. The use of delta pricing allows the seller to focus the potential purchaser's attention on the incremental difference in price, and to heighten the potential purchaser's awareness of the fact that they will not pay the absolute price of the feature, but only the incremental difference in price.

An application programming interface (API) that is capable of supporting delta pricing according to embodiments of the present invention can be in the form of, for example, the following:

deltaPricing(sessionObject, <pricing types/result/delta to return>, baseConfigurationObject, [[<items to add>, <items to delete>], [<items to add>, <items to delete>]] . . . )

where sessionObject: This supports the pricing service "caching" described herein. This is described as an object because it is beneficial to be able to pass multiple values (properties) on the object rather than using a single value (although that approach can be used as well).

<pricing types/result/delta to return>: This relates to what values are to be returned. In the examples herein, only the delta price is discussed, but any piece of the price calculation can be returned, if so desired. For example, for an upsell, it is desirable to return the delta price and other values, to demonstrate the cost advantage provided by the delta price.

baseConfigurationObject: This is used to relate the current (base) state, to which the other items will be added or deleted when pricing.

[<items to add>, <items to delete>], This is where the items for delta pricing are specified. In the previous example relating to the purchase of a vehicle, one pairing of add/deletes would be <CD Player>,<Stock Radio>, another would be <High-End Stereo System>,<Stock Radio>, and another would be <Leather Seats, Luxury Package>,<none>. It is desirable to be able to omit such parameters entirely or add a potentially infinite number of such items. It will be noted that if no add/delete items are specified, the deltaPricing( ) will typically function in a manner similar to a basic quote/price method.

There are several options with regard to the type of object (s) to be used to specify the base configuration and items for addition/deletion. The simplest solution is to specify a concatenation or collection of part numbers (strings). While simple, such a solution can limit the functionality made available to the programmer. Items may be priced differently in a configuration. For example, a standalone CD Player will typically cost more than a pre-installed CD Player, and if the part numbers are the same, another way is needed to indicate that information. This is most commonly done with the use of a structure. Preferably, the structure is related with the parameter objects. This can would allow greater backward compatibility with any preceding, simpler functionality. The quote object allows the specification of all the header information (date, org, pricing sequence, and so on), while the line items allow the specification of quantities, part numbers, and structure (though ID and parentIDs).

From a technical standpoint, as the number of features (or product combinations or the like) increase, the amount of information that needs to be aggregated increases exponentially. For example, if a product has fifty features and the potential purchaser is interested in four configurations, each feature must be priced (50 operations) and this must be done four times (for a total of 200 operations). The complexity of such situations now becomes clear, and the cost, even given the marketing value of such capabilities, can be an obstacle. A software architecture that allows delta pricing information to be generated quickly and efficiently, as well as one that supports the implementation of the API described above, is now described.

An Example Software Architecture Supporting Efficient Delta Pricing

Figure 1C:
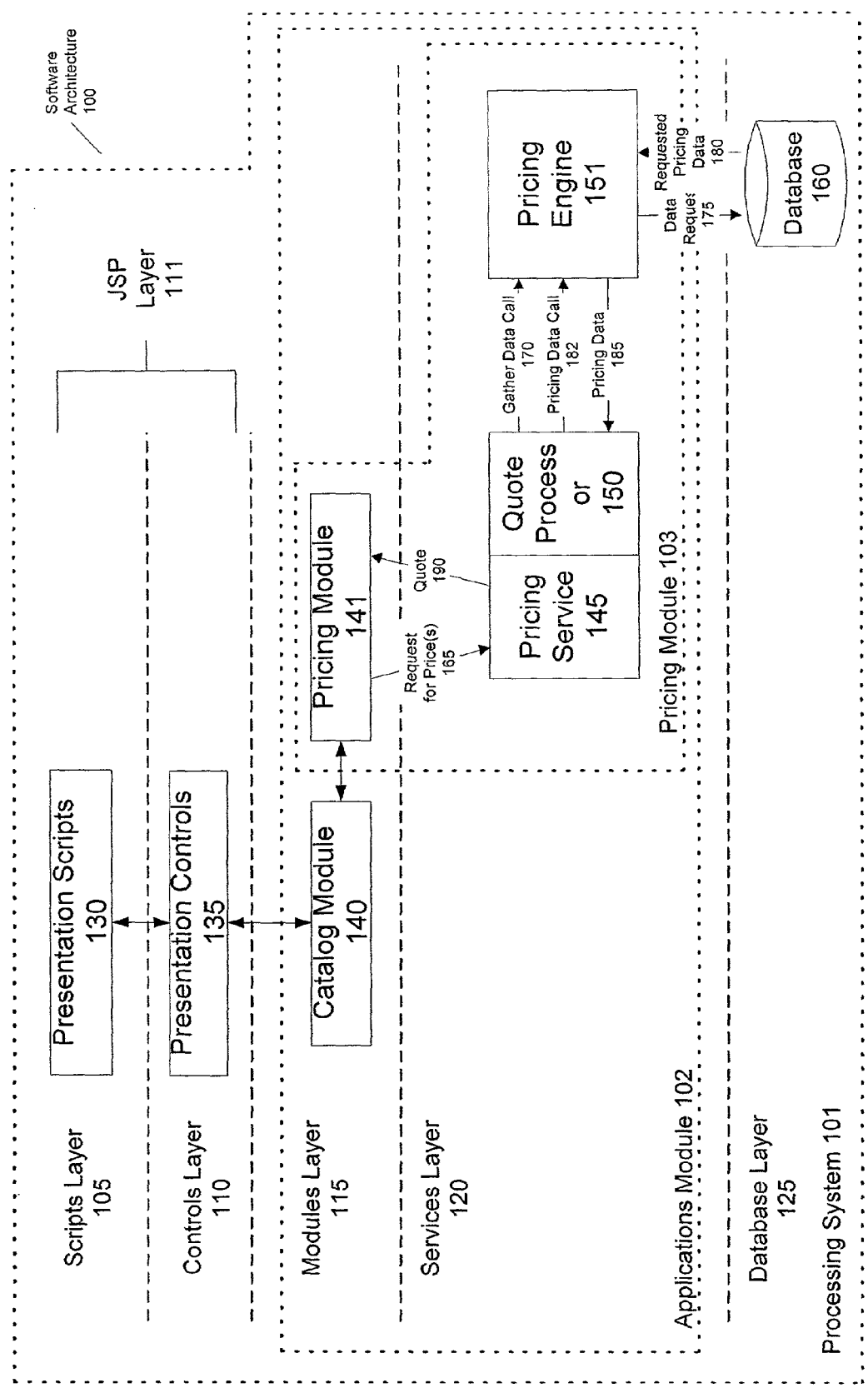
FIG. 1C is a block diagram illustrating the software architecture used to support the processes depicted in FIGS. 1A and 1B.

FIG. 1C is a block diagram illustrating an example of a software architecture 100 that includes various layers and modules which support embodiments of the present invention. Software architecture 100 is made up of a processing system 101 (e.g., a server (e.g., a website server) configured to support an e-commerce website), which is configured to process and present pricing information to a potential purchaser access processing system 101 using, for example, a browser. In turn, processing system 101 includes an applications module 102, which in turn includes a pricing module 103.

Processing system 101 includes a scripts layer 105 and a controls layer 110, which together form a JSP layer 111, as well as applications module 102. Applications module 102 includes a modules layer 115, a services layer 120. Processing system 101 also includes a database layer 125. Scripts layer 105 includes a set of presentation scripts 130, which may be implemented using a scripting language, for example. Similarly, controls layer 110 includes a set of presentation controls 135. Presentation controls 135 provide functionality that interoperates with presentation scripts 130 to generate the user interface presented to a customer accessing a website supported by software architecture 100. The functionality provided by presentation controls 135 includes management of HTML controls, lists, links and buttons that provide the functionality presented by such a website.

Typically, controls have no state, except for that which is needed for the actual control itself (e.g., identity). Modules layer 115 includes a catalog module 140 and a pricing module 141 (which is also included as part of pricing module 103), among other modules. Catalog module 140 communicates with pricing module 141 to access pricing information via services layer 120. In general, modules are used for tasks such as cross-module communication and management of communications with the various services to which the given module belongs. Modules are generally stateless, with the user's state typically residing in JSP layer 111. As its name implies, catalog module 140 provides the requisite catalog functionality, and, by communicating with other elements described subsequently, allows a customer to obtain pricing information regarding one or more products having one or more selected features (i.e., one or more selected configurations). This can be, for example, a single product, or a number of products (e.g., the products displayed on a page of a catalog). Applications module 102 resides below JSP layer 111 in processing system 101.

Services layer 120 includes a pricing service 145 and a quote processor 150. Quote processor 150 is coupled to a pricing engine 151. Services layer 120 acts as an interface between modules layer 115 and database layer 125, and provides functionality such as data persistence and data preparation, allowing interaction with other functions within the architecture, such as remote resources. A services layer such as services layer 120 also allows for the persistence of the respective information for each of the separate functionalities represented by each service therein, as well as control and management of the given service's data, as well as being able to perform at least some of the more intensive calculations. Typically, a service has no state associated therewith.

In supporting the functionality provided by catalog module 140 and pricing module 141, pricing module 103 (including pricing service 145, quote processor 150 and pricing engine 151) responds to requests for pricing information from pricing module 141 based on information provided by catalog module 140. Such information is provided from the one or more databases of database layer 125 (exemplified by a database 160, which is also referred to herein as a product information database). Database layer 125 (via database 160) effects the actual storage of the data employed by the various functions provided by software architecture 100. In providing such support, database 160 provides pricing service 145 and quote processor 150 with the data necessary for these services to respond to requests from pricing module 141 (and catalog module 140).

For example, pricing module 141 can provide pricing service 145 with a request for price(s) 165 to begin the process of generating the requisite pricing information for display to the customer (e.g., a quote, or in software architecture 100, a super-quote). Pricing service 145 then instantiates quote processor 150 (typically, in response to request for price(s) 165). A gather data call (an indication that pricing engine 151 is to gather data from database layer 125) is then made to pricing engine 151 (depicted in FIG. 1C as a gather data call 170) to indicate to pricing module 151 that pricing data (which, for example, can be in the form of a final price or a pricing delta) is to be requested from database 160. Pricing engine 151 then queries database 160 by sending a data request 175 to database 160, in order to identify a set of data that satisfies the pricing requested. Database 160 responds to data request 175 by providing requested pricing data 180. This process of requesting data from database 160 and database providing such data is more generically referred to herein as accessing database 160.

It will be noted that, in a preferred embodiment, once quote processor 150 is instantiated by pricing service 145, quote processor 150 is also passed to pricing engine 151, in addition to gather data call 170. In this scenario, quote processor 150 is essentially a "plug-in" that is executed within the context of pricing service 145. It will also be noted that, in a preferred embodiment, two calls are actually made to pricing engine 151. Pricing service 145 passes quote processor 150 to pricing engine 151, then makes the two calls to pricing engine 151. In the first call, quote processor 150 is passed as part of gather data call 170, which causes the caching of data (e.g., in pricing engine 151). A second call, a pricing data call 182, actually prices the quote and so returns the price(s) of item(s) in the quote.

In traditional approaches, only a data call (somewhat similar to pricing data call 182) is supported, allowing only single data requests to be made. In embodiments of the present invention, however, the use of gather data call 170 allows all the data required to satisfy all the quotes contained in the given super-quote in one operation, and so permits pricing engine 151 to load the requisite data from database 160 only once.

In a more general sense, each layer of a computer architecture, peripheral storage (e.g., a hard disk) is approximately an order of magnitude slower than the computer's memory. Memory, in turn, is still approximately an order of magnitude slower than off-chip cache, and off-chip cache is approximately an order of magnitude slower than on-chip cache. Thus, there is roughly an order of magnitude at each one of those layers. This is also true outside a single-computer architecture. If the processing is contained within the one computer (e.g., entirely at the web browser), that scenario is going to be approximately an order of magnitude faster than making a call into the applications server. Operations that involve only an applications server are going to be approximately an order of magnitude faster than operations that involve accessing a database. Thus, subsequent pricing data calls (e.g., pricing data call 182), which do not require the performance of database accesses, are processed significantly faster, and so make delta pricing a practical reality.

Once pricing engine 151 receives requested pricing data 180, pricing engine 151 uses this information to generate pricing data 185. A pricing data call 182 is made to pricing engine 151. In response, pricing engine 151 passes pricing data 185 to quote processor 150 (and so pricing service 145). Pricing service 145 then passes this information to pricing module 141 as a quote 190. It will be noted that this and other requests discussed herein are in response to customer actions presented via scripts layer 105 (e.g., presentation scripts 130) and controls layer 110 (e.g., presentation controls 135). It will also be noted that, in some embodiments, the quote object (representing the quote) is actually passed between elements of software architecture 100 during gather data call 170, pricing data call 182, the return of pricing data 195, and the return of quote 190, as previously noted.

Using a super-quote, quote processor 150 is able to include the requests necessary for multiple quotes in gather data call 170. Once pricing engine 151 queries database 160, the pricing data retrieved from database 160 (i.e., requested pricing data 180) includes the pricing data necessary to satisfy the multiple quotes included in the super-quote. The pricing data in requested pricing data 180 is maintained in quote processor 150. Thus, once a super-quote has been processed, the pricing data maintained in pricing engine 151 allows quote processor 150 to generate pricing data for the multiple quotes by simply calling the pricing engine with various of the items in the super-quote marked as inactive (or active) (i.e., using multiple pricing data calls (e.g., pricing data call 182)).

Thus, in the situation where a product has a number of features, variations of the basic product (having varying feature sets) can be priced by marking the desired features (in allowable combinations, possibly) as active, while marking other features inactive. In the catalog scenario, a single page of pricing data might be retrieved, and so the items on that page would be marked active. Alternatively, pricing data for several pages might be retrieved (e.g., the preceding and following catalog pages, as well as the current catalog page), allowing quick presentation of pricing data as a customer paged through a catalog. It will be noted that the pricing rules (actually, configuration rules), are typically implemented in XML, and are used by the configuration engine, which executes in modules layer 115. The pricing rules can be, for example, of the form "if the car includes leather upholstery, the price for the premium stereo is $[price]."

Figure 2:
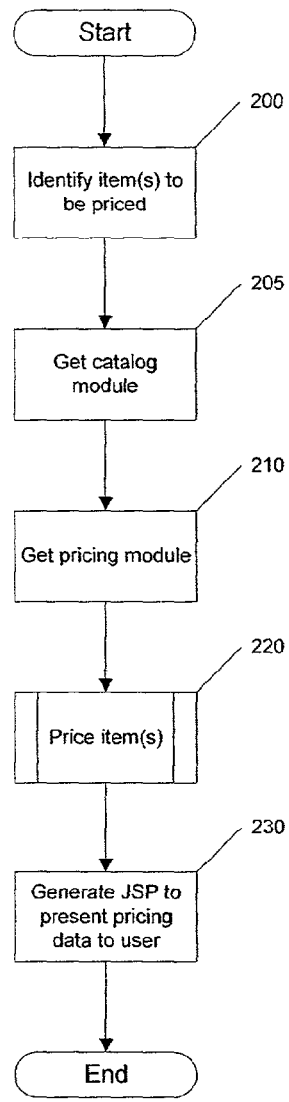
FIG. 2 is a first flow diagram illustrating a process in which pricing for one or more items is determined.

FIG. 2 is a flow diagram illustrating the actions performed in scripts layer 105 and controls layer 110 in generating a price quote using software architecture 100. The process begins with the customer's inputting information, using scripts layer 105 and controls layer 110, that will allow catalog module 140 to identify one or more items to be priced (step 200). It will be noted that the use of catalog module 140 is merely exemplary, as any one of a number of module types could employ, and be employed in, a software architecture such as that described herein. This may consist of, for example, a customer identifying a base configuration of a product (from which various other possible configurations may be generated) or a request for one or more items from a catalog (e.g., a page of a catalog). Using the latter scenario as an example, controls layer 110 initiates a get catalog module operation (step 205) and a get pricing module operation (step 210). Next, the items are priced, which entails one or more calls from controls layer 110 through modules layer 115 to services layer 120 (step 220). Once the requisite prices are thus generated, the pricing data is presented to the customer (e.g., using JSP) (step 230). It will be noted that the use of JSP information in presenting the pricing information to the customer is merely an example of one way in which the pricing data can be displayed. It will also be noted that, in certain embodiments (such as that shown), catalog module 140 employs pricing module 141 to price the items.

As noted, FIG. 2 depicts a flow diagram illustrating the process of generating a price quote according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 2, as with other of the processes described herein, may be executed by a module (e.g., a software module) or a portion of a module or a computer system user using, for example, a computer system such as the storage router previously mentioned, or a similar network element, as well as a computer system such as that described subsequently herein. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, etc. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 3:
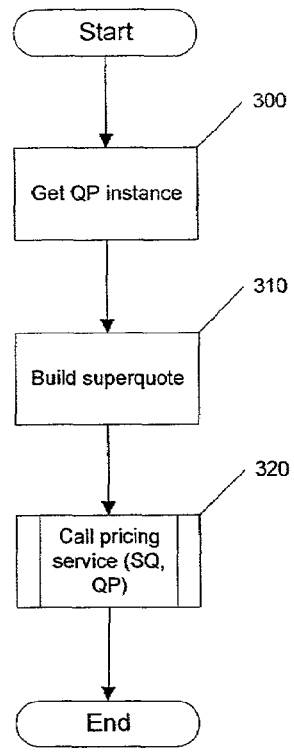
FIG. 3 is a second flow diagram illustrating a process in which pricing for one or more items is determined.

FIG. 3 is a flow diagram illustrating the actions performed by pricing module 141 (in communication with catalog module 140, and, e.g., within modules layer 115) in response to a request to price one or more items (which appears in FIG. 2 as step 220). The process begins with the instantiation of a quote processor within services layer 120 (step 300). Next, a super-quote is built by pricing module 141 for servicing by services residing in services layer 120 (e.g., quote processor 150 and pricing service 145) (step 310). The super-quote contains sufficient information to permit the generation of a number of quotes. Thus, for example, the super-quote may contain all the information required to present the customer with pricing information for all the products on the page of a catalog. Pricing module 141 then calls pricing service 145 by sending request for price(s) 165 (containing, for example, a super-quote and an identifier identifying the instance of quote processor 150 to be employed) to pricing service 145 (step 320). The identifier can be used, for example, to identify which one of a number of quote processors to which the super-quote is to be sent. Thus, each quote processor can have its own definition of the bits in a given data structure (e.g., bit vector (described subsequently)). This allows the same infrastructure to be used to process a variety of super-quotes, simply by enlisting the services of the quote processor configured to process the given super-quote. Pricing service 145 responds to catalog module 140 with quote 190 that contains the pricing data requested. Pricing module 141 receives the results for presentation to the customer via JSP layer 111.

Figure 4:
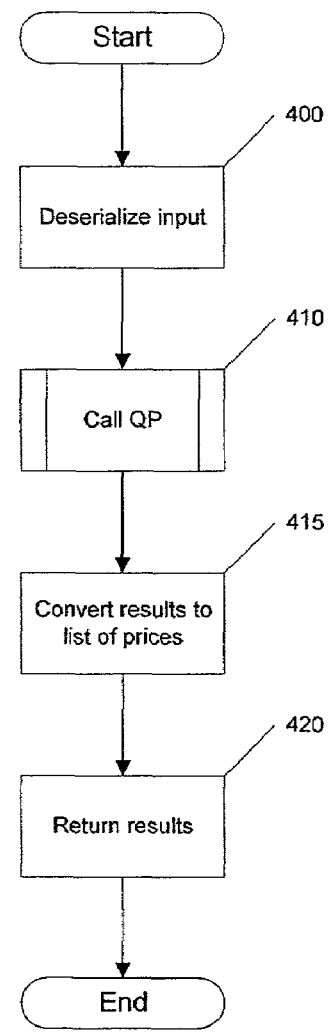
FIG. 4 is a third flow diagram illustrating a process in which pricing for one or more items is determined.

FIG. 4 is a flow diagram illustrating the actions performed within services layer 120 by pricing service 145 in response to being called by pricing module 141 (which appears in FIG. 3 as step 320, a call to pricing service 145). The process begins with the deserialization of request for price(s) 165, which contains, for example, a super-quote and an identifier identifying a quote processor to be employed (e.g., quote processor 150) (step 400). Next, pricing service 145 calls quote processor 150 (step 410). Pricing service 145 passes pricing data 185 to quote processor 150 to enable quote processor 150 to gather the requisite data and thus provide the requisite pricing. Once pricing service 145 receives pricing data 185 from quote processor 150, the results are converted to a list of one or more prices (step 415). It will be noted that the use of a list is only a specific example—the price(s) thus retrieved can be returned in any appropriate or desirable format. Typically, a catalog will employ price lists, for example. Pricing service 145 then returns the requested information (e.g., quote 190) to pricing module 141 (step 420). It will be noted that, in returning the requested information, the results are packaged and serialized in a process that is essentially the mirror image of that just noted.

Figure 5A:
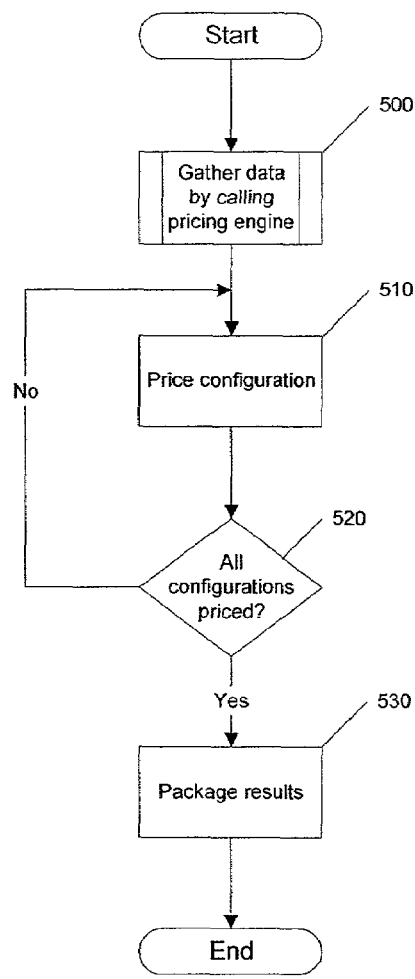
FIG. 5A is a fourth flow diagram illustrating a process in which pricing for one or more items is determined.

FIG. 5A is a flow diagram illustrating the actions performed by quote processor 150 in gathering pricing data and pricing one or more items in response to a request from pricing service 145. The process begins with quote processor gathering data by calling pricing engine 151 (step 500). This call is depicted as gather data call 170 in FIG. 1. This call causes pricing engine 151 to access database 160. Once the requisite pricing data has been gathered, quote processor 150 proceeds with pricing the one or more configurations to be priced (e.g., via a pricing data call such as pricing data call 182). This method of accessing database 160 (multiple accesses generated in response to one super-quote) allows the pricing of multiple products, multiple configurations of a single product and other such multiple pricing scenarios, in response to a single super-quote. The aforementioned advantages are thus provided, including fewer database accesses and faster response times. Quote processor 150 first prices a configuration (step 510), then determines whether all configurations requiring pricing have been thus priced (step 520). Once this iterative portion of the process completes, the results of these operations are packaged for provision to pricing service 145 as pricing data 185, and so, on to pricing module 141 as quote 190 (step 530). It will be noted that pricing data 185 can be a specific price (e.g., the price of the given configuration) or a pricing delta (e.g., the difference in price between a base configuration and another configuration).

Figure 5B:
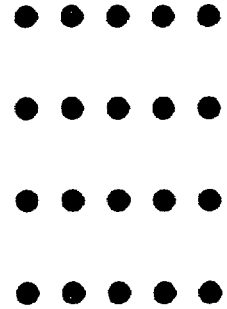
FIG. 5B is a diagram illustrating an example data structure of a super-quote.
Figure 5B:
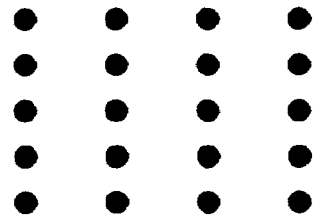
Figure 5B:
Figure 5B:

FIG. 5B is a diagram illustrating an example of a data structure that can be used to implement portions of a super-quote. The data structure depicted in FIG. 5B is a set of bit vectors (bit vectors 550). Bit vectors 550 include a number of bits (bits 560(1,1)-(N,N)) that indicate whether a given configuration of a given product includes one or more of the features available for that product. For example, a column in bit vectors 550 (e.g., bits 560(1,2)-(N−2)) can be used to represent the presence or absence of a given feature in the product configuration corresponding to each row of bit vectors 550. This might be the case where a customer requests the base configuration of a given product (e.g., represented by the first row of bit vectors 550, bits 560(1,1)-(1,N)), and the most popular (most likely to be requested) configurations are also retrieved. In that case, the presence or absence of the relevant features would be indicated by bits 560(1,1)-(N,N). Thus, when pricing service 145 requests further pricing data (or other data) (e.g., on other configurations of the product reflected in bit vectors 550), quote processor 150 is able to respond without database 160 having to be queried.

In fact, the use of a super-quote also allows a customer to price multiple configurations simultaneously. For example, in the case where a user desires to compare a number of configurations of a given vehicle, a super-quote that retrieves pricing data for each such configurations can be constructed. In that case, bit vector 550 contains values that reflect the various configurations to be priced.

Alternatively, a catalog page might be requested. In that scenario, each column of bit vectors 550 represents a corresponding product on the given catalog page. Thus, each row of bit vector 550 contains a single affirmative value (e.g., a one), for the given product represented thereby. Bit vector 550 thus might contain a diagonal filled with affirmative values, with the rest of the values being negative (e.g., zeroes). To generate the prices (or other information) needed for a catalog page, pricing service 145 simply requests the necessary information for each product on the catalog page, to which quote processor 150 responds with data for each product, again without resort to database 160.

Thus, a super-quote achieves at least two objectives. First, the super-quote allows data for multiple quotes to be gathered using fewer accesses than would typically be used in gathering such information. Second, the use of a super-quote in a software architecture according to embodiments of the present invention decouples the quote (or super-quote) from the processing of that quote. Pre-processing and post-processing of a quote can be performed at any time, once the information (e.g., pricing data) has been retrieved. This is due, in part, to the persisting of data in memory—post-processing can occur at any time, once the data has been persisted. This persistence can be effected by caching the information in memory, for example. Moreover, the use of a bit vector such as bit vector 550 (or similar data structure) allows for the efficient representation of such information.

Figure 6:
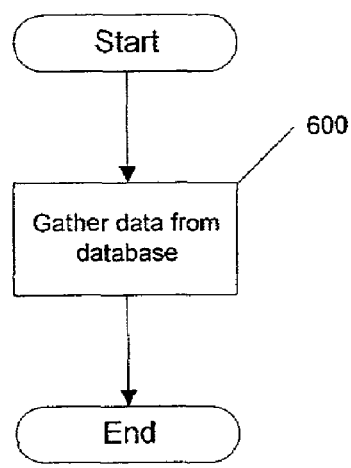
FIG. 6 is a fifth flow diagram illustrating a process in which pricing for one or more items is determined.

FIG. 6 is a flow diagram illustrating the actions performed by pricing engine 151 in accessing database 160. The process consists of pricing engine 151 gathering data from database 160 by sending data request 175 and receiving requested pricing data 180 in response (step 600). It is this operation that the present invention minimizes through the use of a super-quote, by making a request that includes multiple queries. By including a request for the data necessary to satisfy all such queries in the given super-quote, software architecture 100 avoids the need to make such queries separately, and so the overhead associated with such multiple queries.

An Example Computing and Network Environment

Figure 7:
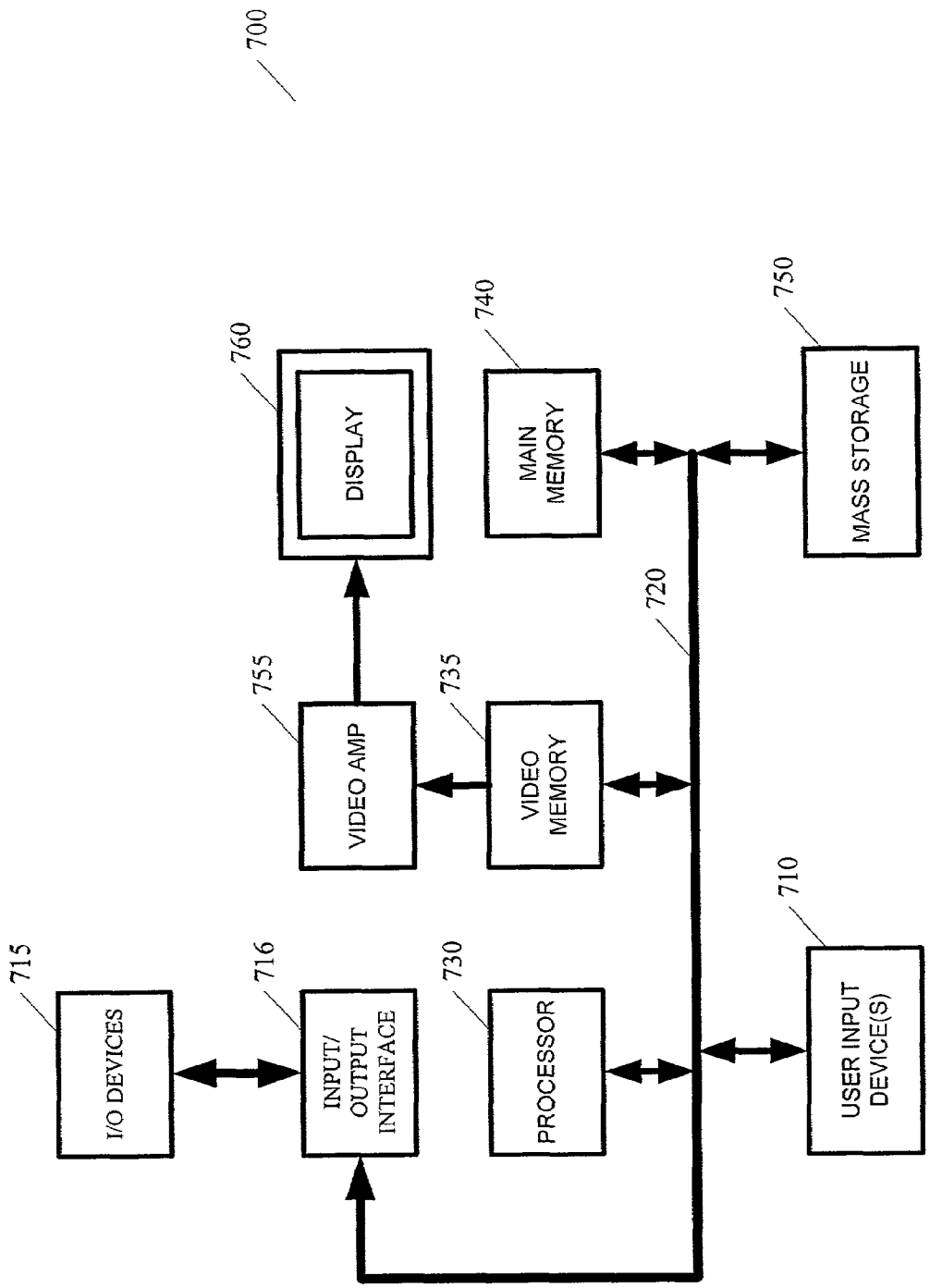
FIG. 7 is a block diagram illustrating a computer system suitable for implementing embodiments of the present invention.

FIG. 7 depicts a block diagram of a general-purpose computer 700 suitable for implementing embodiments of the present invention, for example, clients and/or servers in a client/server architecture. General-purpose computer 700 is typically a data processing system designed to provide computing power to one or more users, either locally or remotely. Input user device(s) 710, such as a keyboard and/or mouse, as well as other input/output (I/O) devices 715 (via I/O interface (I/F) 716) are coupled to a bi-directional system bus 720. The input user device(s) 710 permit user input to the computer system and communicating that user input to processor 730. General-purpose computer 700 also includes a video memory 735, a main memory 740 and a mass storage unit 750, all coupled to bi-directional system bus 720 along with input user device(s) 710 and processor 730. Mass storage unit 750 may include both fixed and removable media, such as floppy disk(s), hard disk(s), tape drive(s), CD-ROM drive(s), CD-RW drive(s) and the like. Bus 720 may contain, for example, 732 address lines for addressing video memory 735, main memory 740, controllers for mass storage unit 750 and the like. System bus 720 also includes, for example, a 82-bit data bus for transferring data between and among the components, such as mass storage unit 750, processor 730, video memory 735 and main memory 740. Alternatively, multiplex data/address lines may be used instead of separate data and address lines.

Computer programs and data are generally stored as instructions and data in mass storage unit 750 until loaded into main memory 740 for execution. Computer programs may also be in the form of electronic signals modulated in accordance with the computer program and data communication technology when transferred via a network. The method and functions relating to the present invention may be implemented in a computer program alone or in conjunction with combinations of hardware and software. Furthermore, context subsystem data structures can be implemented in and utilized by general-purpose computer 700, or by other data processing systems that have access to the data structures.

In an embodiment of this invention, processor 730 is a 82-bit microprocessor manufactured by Motorola (e.g., an 680×0 microprocessor) or by Intel (e.g., an 80×86 or Pentium microprocessor). However, any other suitable microprocessor or microcontroller may be utilized. Main memory 740 is preferably comprised of dynamic random access memory (DRAM). Video memory 735 is preferably a dual-ported video random access memory. One port of the video memory 735 is coupled to video amplifier 755. The video amplifier 755 is used to drive the display 760. Video amplifier 755 is well known in the art and may be implemented by any suitable means. This circuitry converts pixel data stored in video memory 735 to a raster signal suitable for use by display 760. Display 760 is a type of monitor suitable for displaying graphical images.

The computer system described above is depicted for purposes of example only. The present invention may be implemented in any type of computer system or programming or processing environment. It is contemplated that the present invention might be run on a stand-alone computer system, such as the one described above. The present invention might also be run from a server system that can be accessed by a plurality of client computer systems interconnected over an intranet network. Finally, the present invention may be run from a server that is accessible to clients over a wide-area network (WAN) such as the Internet, as is described with regard to FIG. 8.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application.

Figure 8:
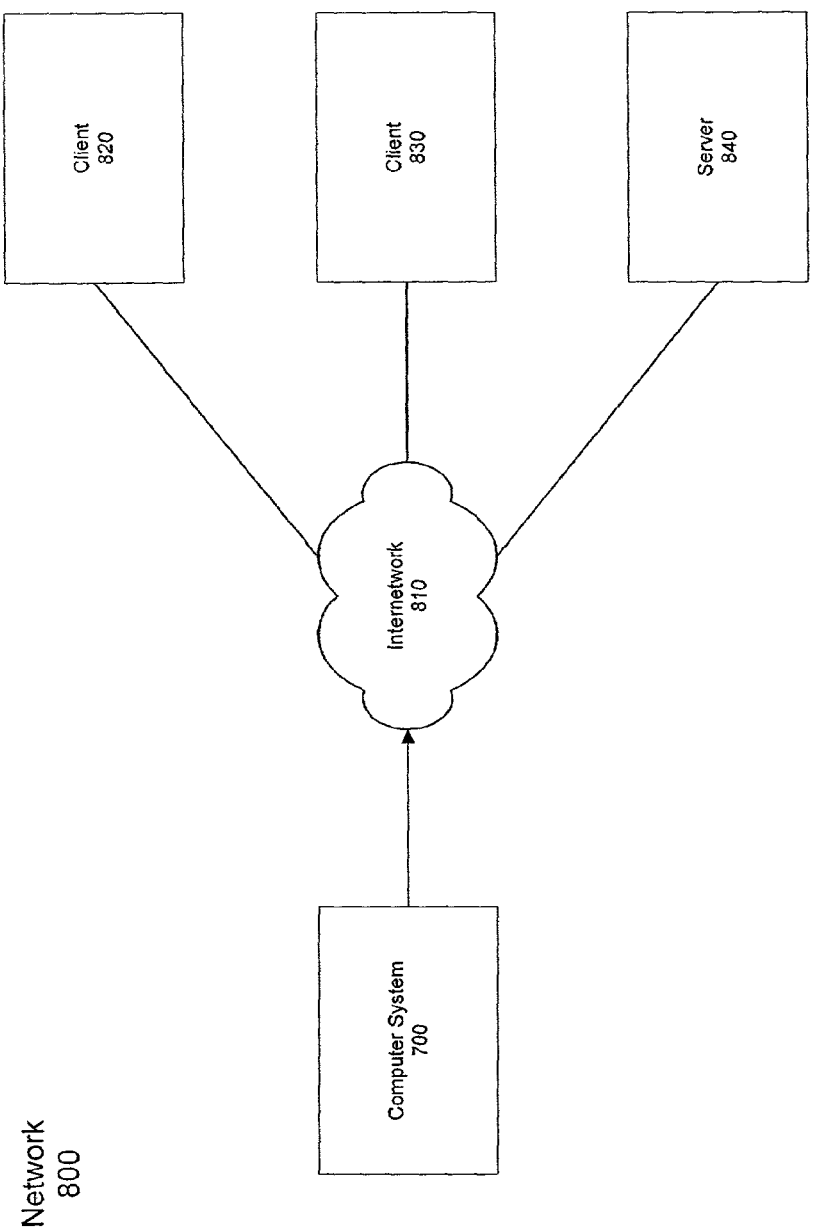
FIG. 8 is a block diagram illustrating the interconnection of the computer system of FIG. 7 to client and host systems.

FIG. 8 is a block diagram depicting a network 800 in which general-purpose computer 700 is coupled to an internetwork 805, which is coupled, in turn, to client systems 810 and 820, as well as servers 830 and 835. Internetwork 805 (e.g., the Internet) is also capable of coupling client systems 810 and 820, and servers 830 and 835 to one another. With reference to general-purpose computer 700, modem 747, network interface 748 or some other method can be used to provide connectivity from general-purpose computer 700 to internetwork 805. General-purpose computer 700, client system 810 and client system 820 are able to access information on one or both of servers 830 and 835 using, for example, a web browser (not shown). Such a web browser allows general-purpose computer 700, as well as client systems 810 and 820, to access data on servers 830 and 835 representing the pages of a website hosted by a respective one of servers 830 and 835. Protocols for exchanging data via the Internet are well known to those skilled in the art. Although FIG. 8 depicts the use of the Internet for exchanging data, the present invention is not limited to the Internet or any particular network-based environment.

Referring to FIGS. 7 and 8, a browser running on a computer system (e.g., computer system 700) can employ a TCP/IP connection to pass a request to a server (e.g., server 830), which can run an HTTP "service" (e.g., under the WINDOWS® operating system; also referred to herein as an HTTP server) or a "daemon" (e.g., under the UNIX® operating system), for example. Such a request can be processed by contacting such an HTTP server using a protocol that can be used to communicate between the computer and the server (i.e., HTTP). The HTTP server then responds to the protocol, typically by sending a "web page" formatted as an HTML file. The browser interprets the HTML file and may form a visual representation of the same using local resources (e.g., fonts and colors).

Referring again to FIGS. 7 and 8, server 830 (which includes an HTTP server, as previously noted) can further include a web server (not shown), an application server (also not shown) and a database server operating with an open distributed object computing infrastructure such as Common Object Request Broker Architecture (CORBA) (also not shown). The web server can include a user interface layer and a centralized dispatch mechanism, both of which can be implemented employing Java Server Pages (JSP), for example.

One advantage of employing JSP is that the use of JSP facilitates organization of a website as a state machine. In this manner, the logical organization of a website can be arranged in categories, for example: Controls, States and Transitions. Controls include a Java class of elements that manage the active elements of a page such as render control text or interpret user's action with respect to a page. Examples of controls would be the management of a virtual button on a web page or login management that could include providing a number of dialog boxes containing text and a virtual button. States define a user's current location on the website (e.g., in a state machine), such as the web page that a user is presently viewing. States also define the relationship of a user with respect to a web page being viewed. Transitions define the new state of a user and are a function of a users interaction with a page. Specifically, a transition is defined by the user's current state and the actions taken by the user while in that state (e.g., the result of user operation on a control alters the user's state). Simply put, the user's new state is simply defined as the user's current state, as modified by the transition selected. The transitions are located in a transition module that is responsible for all transitions.

Advantages of the state machine model of the website are that it is has maintainability to facilitate update flow or pages very easily and per user state machine. service different users with maximum code reuse. It is also consistent in that most or all server logic is handled under the same paradigm. Login control, record and display controls cause transitions which update state. Typically, XML/XSL defines the state machine, page content and layout. Such a methodology can also be compatible with the Wireless Application Protocol (WAP). This can extend an existing web site to provide alternative state machines for WAP users.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for generating prices of one or more configurations of features of a product, the method comprising:
using a computer system configured to perform each of the following:
receiving at least a modification of one or more of features of a first configuration of the product;
generating a first delta price for a second configuration of the product after receiving the modification of the one or more features of the first configuration, wherein the second configuration is the first configuration as modified by the received modification, the modification of the one or more features of the first configuration results in a price change between the first and second configurations of the product, and the first delta price comprises the price change;
generating a price of the second configuration using the first delta price and the price of the first configuration; and
providing the first delta price and the price of the second configuration of the product to a computer system of a user to indicate to the user a pricing impact associated with the modification of the one or more features of the first configuration of the product.

2. The method of claim 1 wherein the price of the first configuration prior to the modification of one or more features of the first configuration represents a base price of the first configuration, the method further comprising: using the computer system to perform:
generating a final price of the second configuration using the base price and the first delta price.

3. The method of claim 2, wherein generating the final price of the second configuration comprises adjusting the base price by the delta price.

4. The method of claim 2, further comprising:
using the computer system to perform:
receiving a selection of an additional feature, wherein:
the modification of the one or more features of the first configuration comprises adding an additional feature to the first configuration;
the final price is associated with the product; and
a second delta price is generated in response to the selection of the additional feature for the product.

5. The method of claim 2, further comprising:
using the computer system to perform:
receiving a selection removing a feature from the first configuration, wherein:
the modification of the one or more features of the first configuration comprises removing the feature from the first configuration;
the final price is associated with the product; and
the final price is generated in response to the selection removing the feature from the product first configuration.

6. The method of claim 2, wherein:
the computer system of the user is a client computer system;
the first delta price is generated by a server computer system, the first delta price is generated in response to the modification of one or more of features of the first configuration of the product at the client computer system, and
the client computer system is communicatively coupled to the server computer system.

7. The method of claim 6 further comprising:
using the computer system to perform:
providing the final price to the client computer system for display by the client computer system.

8. The method of claim 2, wherein:
the base price is generated in response to a selection of the first configuration of the product, and
the first delta price is generated in response to at least one member of a group consisting of: addition of one or more features to the first configuration, removal of one or more features of the first configuration, and substitution of one or more features of the first configuration with one or more additional features of the first configuration.

9. The method of claim 8, wherein:
the product is a service.

10. The method of claim 1 further comprising:
using the computer system to perform:
receiving at least a modification of one or more features of the second configuration of the product;
generating a second delta price for a third configuration of the product after receiving the modification by changing a number of the one or more features in the second configuration, wherein the third configuration is the second configuration as modified by the received modification of the one or more features of the second configuration, the modification of the one or more features of the second configuration results in a price change between the second configuration and the third configuration of the product, and the second delta price comprises the price change between the second and third configurations of the product;
generating a price of the third configuration using second delta price and the price of the second configuration; and providing the price of the third configuration and the second delta price to the computer system of the user to indicate to the user a pricing impact associated with the modification of the one or more features of the second configuration of the product.

11. The method of claim 10, wherein:
the computer system of the user is a client computer system;
the first delta price and the second delta price are generated by a server computer system;
the first delta price is generated in response to a first selection of a first feature at the client computer system;
the second delta price is generated in response to a second selection of a second feature at the client computer system; and
the client computer system is communicatively coupled to the server computer system.

12. The method of claim 11 further comprising:
using the computer system to perform:
generating a final price of the third configuration using a base price of the first configuration and the second delta price; and
providing the final price to the client computer system for display by the client computer system to allow comparison between the final price and the modified price of the second configuration.

13. The method of claim 8 wherein modification of the one or more features of the first configuration further comprises adding multiple features to the first configuration.

14. The method of claim 8 wherein modification of the second configuration further comprises at least one member of a group consisting of: adding multiple features to the second configuration and removing at least one of the features of the second configuration.

15. The method of claim 1 wherein the modification of the one or more features of the first configuration comprises at least one member of a group consisting of: addition of one or more features to the first configuration, removal of one or more features of the first configuration, and substitution of one or more features of the first configuration with one or more additional features of the first configuration.

16. The method of claim 1 wherein a unique feature is a feature not common to both the first and second configurations of the product, each unique feature has an individual price, and the price change does not equal an aggregate of each individual price for each unique feature.

17. The method of claim 1 further comprising:
using a computer system to perform:
receiving modifications of one or more features of the second configuration, wherein the modifications of the one or more features of the first configuration and the modification of the one or more features of the second configuration are sent at one time by a user; and
providing a comparison between a price of the first configuration and the price of the second configuration of the product.

18. A tangible computer storage medium comprising code for generating prices of multiple configurations of features of a product, wherein the code is executable by a processor of a computer system, wherein when executed by the processor the code causes the computer system to:
receive at least a first and second configurations modification of one or more of features of a first configuration of the product;
generate a first delta price for a second configuration of the product following after receiving the modification of the one or more features of the first configuration, wherein the second configuration is the first configuration as modified by the received modification, the modification of the one or more features of the first configuration results in a price change between the first and second configurations of the product, and the first delta price comprises the price change;
generate a price of the second configuration using the first delta price and the price of the first configuration; and
provide the first delta price and the price of the second configuration of the product to a computer system of a user to indicate to the user a pricing impact associated with the modification of the one or more features of the first configuration of the product.

19. The tangible computer storage medium of claim 18 wherein the price of the first configuration prior to the modification of one or more features of the first configuration represents a base price of the first configuration and wherein the code further causes the computer system to:
generate a final price of the second configuration using the base price and the first delta price.

20. The tangible computer storage medium of claim 19, wherein to generate the final price of the second configuration comprises adjusting the base price by the delta price.

21. The tangible computer storage medium of claim 19 wherein the code further causes the computer system to:
receive a selection of an additional feature, wherein:
the modification of the one or more features of the first configuration comprises adding an additional feature to the first configuration;
the final price is associated with the product; and
a second delta price is generated in response to the selection of the additional feature for the product.

22. The tangible computer storage medium of claim 19 wherein the code further causes the computer system to:
receive a selection removing a feature from the first configuration, wherein:
the modification of the one or more features of the first configuration comprises removing the feature from the first configuration;
the final price is associated with the product; and
the final price is generated in response to the selection removing the feature from the product first configuration.

23. The tangible computer storage medium of claim 19 wherein the code further causes the computer system to:
provide the final price to the computer system of the user for display by the computer system of the user.

24. The tangible computer storage medium of claim 19, wherein:
the base price is generated in response to a selection of the first configuration of the product, and
the first delta price is generated in response to at least one member of a group consisting of: addition of one or more features to the first configuration, removal of one or more features of the first configuration, and substitution of one or more features of the first configuration with one or more additional features of the first configuration.

25. The tangible computer storage medium of claim 24, wherein: the product is a service.

26. The tangible computer storage medium of claim 18 further comprising code to:
receive at least a modification of one or more features of the second configuration of the product;
generate a second delta price for a third configuration of the product after receiving the modification by changing a number of the one or more features in the second configuration, wherein the third configuration is the second configuration as modified by the received modification of the one or more features of the second configuration, the modification of the one or more features of the second configuration results in a price change between the second configuration and the third configuration of the product, and the second delta price comprises the price change between the second and third configurations of the product;

generate a price of the third configuration using second delta price and the price of the second configuration; and provide the price of the third configuration and the second delta price to the computer system of the user to indicate to the user a pricing impact associated with the modification of the one or more features of the second configuration of the product.

27. The tangible computer storage medium of claim 26, wherein the first delta price is generated in response to a first selection of a first feature; and the second delta price is generated in response to a second selection of a second feature.

28. The tangible computer storage medium of claim 19 the tangible computer storage medium further comprising code to:

generate a final price of the third configuration using a base price of the first configuration and the second delta price; and provide the final price of the third configuration to the client computer system for display by the client computer.

29. The tangible computer storage medium of claim 18 wherein the modification of the first configuration comprises adding an additional feature to the configuration.

30. The tangible computer storage medium of claim 18 wherein modification of the first configuration further comprises adding multiple features to the configuration.

31. The tangible computer storage medium of claim 18 wherein modification of the first configuration further comprises adding multiple features to the configuration and removing at least one of the features of the configuration.

32. The tangible computer storage medium of claim 31 wherein the modification of the first configuration comprises removing one of the features of the configuration.

33. The tangible computer storage medium of claim 31 wherein a unique feature is a feature not common to both the first and second configurations of the product, each unique feature has an individual price, and the price change does not equal an aggregate of each individual price for each unique feature.

34. An apparatus for generating prices of multiple configurations of features of a product, the apparatus comprising:

a receiver to receive at least a modification of one or more of features of a first configuration of the product;

generating a first delta price for a second configuration of the product after receiving the modification of the one or more features of the first configuration, wherein the second configuration is the first configuration as modified by the received modification, the modification of the one or more features of the first configuration results in a price change between the first and second configurations of the product, and the first delta price comprises the price change;

means for generating a price of the second configuration using the first delta price and the price of the first configuration;

means for providing the first delta price and the price of the second configuration of the product to a computer system of a user to indicate to the user a pricing impact associated with the modification of the one or more features of the first configuration of the product.

* * * * *

UNITED STATES PATENT AND TRADEMARK OFFICE
CERTIFICATE OF CORRECTION

PATENT NO. : 7,584,155 B1
APPLICATION NO. : 10/061896
DATED : September 1, 2009
INVENTOR(S) : Carter, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1443 days.

Signed and Sealed this

Fourteenth Day of December, 2010

David J. Kappos
*Director of the United States Patent and Trademark Office*